(12) United States Patent
Fitzgibbon et al.

(10) Patent No.: US 7,642,895 B2
(45) Date of Patent: Jan. 5, 2010

(54) GARAGE DOOR OPERATOR HAVING THUMBPRINT IDENTIFICATION SYSTEM

(75) Inventors: James J. Fitzgibbon, Batavia, IL (US); Mark L. Karasek, Lombard, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 202 days.

(21) Appl. No.: 09/735,141

(22) Filed: Dec. 12, 2000

(65) Prior Publication Data
US 2003/0210131 A1 Nov. 13, 2003

Related U.S. Application Data

(60) Provisional application No. 60/172,677, filed on Dec. 20, 1999.

(51) Int. Cl.
*G06F 7/04* (2006.01)
(52) U.S. Cl. ............ 340/5.53; 340/5.64; 340/5.71; 340/5.26
(58) Field of Classification Search ............ 340/5.53, 340/5.71, 82.531, 5, 26, 5.64, 5.83, 825.69, 340/825.72; 382/124, 116, 115; 332/116; 235/382.5; 380/270; 713/186
See application file for complete search history.

(56) References Cited

U.S. PATENT DOCUMENTS

| | | | |
|---|---|---|---|
| RE29,525 E | 1/1978 | Willmott | |
| 4,178,549 A | 12/1979 | Ledenbach et al. | |
| 4,210,899 A | 7/1980 | Swonger et al. | ....... 340/146.3 E |
| 4,529,980 A | 7/1985 | Liotine et al. | |
| 4,750,118 A | 6/1988 | Heitschel et al. | |
| 4,754,255 A | 6/1988 | Sanders et al. | ............. 340/64 |
| 4,831,509 A | 5/1989 | Jones et al. | ............ 364/167.01 |
| 4,912,460 A | 3/1990 | Chu | ................. 340/825.31 |
| 5,055,658 A | 10/1991 | Cockburn | .............. 235/382 |

(Continued)

FOREIGN PATENT DOCUMENTS

AU     11321/95 B     4/1995

(Continued)

OTHER PUBLICATIONS

Nicholls, Paul, "New Fingerprint ID System for PC Users", Jan. 1998, http://www.internetnews.com/ec-news/article.php/25241, paragraph 5.*

(Continued)

*Primary Examiner*—Edwin C Holloway, III
(74) *Attorney, Agent, or Firm*—Fitch Even Tabain & Flannery

(57) ABSTRACT

A movable barrier operator having thumbprint identification in either a remote radio frequency transmitter, or a receiver/barrier operator system or both is provided. A control circuit with a non-volatile memory receives thumbprint information from a fingerprint detector device and stores the information, identifying an authorized user. On subsequent operation of the fingerprint detector, a fingerprint data set is received in the control circuit and an attempt is made to match the incoming data with previously stored data thus establishing the identify of the user according to highly reliable biometric principles. As an option, a variety of different actions can be taken based upon the perceived identity of a particular individual, as well as the type of device communicating with the receiver/barrier operator.

14 Claims, 11 Drawing Sheets

U.S. PATENT DOCUMENTS

| | | | |
|---|---|---|---|
| 5,131,038 A | | 7/1992 | Puhl et al. |
| 5,276,444 A | | 1/1994 | McNair |
| 5,280,527 A | * | 1/1994 | Gullman et al. ............ 713/184 |
| 5,412,379 A | | 5/1995 | Waraksa et al. ........ 340/825.72 |
| 5,420,925 A | * | 5/1995 | Michaels .................... 380/262 |
| 5,467,403 A | * | 11/1995 | Fishbine et al. ............ 382/116 |
| 5,521,984 A | | 5/1996 | Denenberg et al. |
| 5,537,102 A | | 7/1996 | Pinnow |
| 5,581,630 A | | 12/1996 | Bonneau, Jr. |
| 5,598,475 A | | 1/1997 | Soenen et al. ................ 380/23 |
| 5,616,966 A | | 4/1997 | Fischer et al. |
| 5,644,645 A | | 7/1997 | Osuga |
| 5,647,364 A | | 7/1997 | Schneider et al. |
| 5,670,933 A | | 9/1997 | Hayashi |
| 5,712,626 A | * | 1/1998 | Andreou et al. ........... 340/5.67 |
| 5,751,224 A | * | 5/1998 | Fitzgibbon ................ 340/5.71 |
| 5,828,773 A | * | 10/1998 | Setlak et al. ................ 382/126 |
| 5,867,802 A | | 2/1999 | Borza |
| 5,903,225 A | | 5/1999 | Schmitt et al. |
| 5,949,349 A | | 9/1999 | Farris et al. |
| 5,999,637 A | * | 12/1999 | Toyoda et al. ............... 382/124 |
| 6,041,410 A | * | 3/2000 | Hsu et al. ................... 713/186 |
| 6,078,265 A | * | 6/2000 | Bonder et al. ............. 340/5.53 |
| 6,111,977 A | | 8/2000 | Scott et al. |
| 6,140,939 A | * | 10/2000 | Flick ..................... 340/825.69 |
| 6,144,293 A | | 11/2000 | Plaschko et al. |
| 6,154,544 A | | 11/2000 | Farris et al. |
| 6,164,403 A | * | 12/2000 | Wuidart ................... 340/425.5 |
| 6,175,923 B1 | * | 1/2001 | Bailey ........................ 713/186 |
| 6,376,930 B1 | * | 4/2002 | Nagao et al. ............... 307/10.2 |

FOREIGN PATENT DOCUMENTS

| | | |
|---|---|---|
| CA | 2156236 A1 | 2/1997 |
| DE | 4331300 A1 | 3/1995 |
| DE | 19511386 C1 | 5/1996 |
| DE | 19648767 A1 | 6/1997 |
| DE | 19747654 A1 | 5/1999 |
| DE | 29804066 U1 | 7/1999 |
| EP | 0239388 A1 | 9/1987 |
| EP | 0710756 B1 | 5/1996 |
| EP | 0913548 A2 | 5/1999 |
| EP | 0942130 B1 | 9/1999 |
| EP | 0 969 644 A1 | 1/2000 |
| EP | 1282082 A1 | 2/2003 |
| EP | 1283502 A1 | 2/2003 |
| JP | 8-030873 A | 2/1996 |
| JP | 11-264268 A | 9/1999 |
| WO | 97/04375 A2 | 2/1997 |
| WO | 97/27533 A1 | 7/1997 |

OTHER PUBLICATIONS

USPTO database search for "thumbprint" in 1976-1999, 2 pages. May 24, 1999.
Print-out of United States Patent No. 4,912,460 from USPTO website. May 24, 1999.
Print-out from "patentsibm" website of WO09852146A1, 2 pages. May 24, 1999.
Print-out from "patentsibm" website of US05796858, 6 pages. May 24, 1999.
Print-out from "patentsibm" website of US05400662, 3 pages. May 24, 1999.
Print-out from "patentsibm" website of US05757278, 2 pages. May 24, 1999.
Print-out from "patentsibm" website of US09740744, 2 pages. May 24, 1999.
Print-out from "xlvision.com/spinoffs" website, 2 pages, dated Nov. 3, 1999.
Print-out from "whovision.com/products" website, 2 pages, dated Nov. 3, 1999.
Report on fingerprint recognition patents entitled Problem Solving Report Question No. 1006484.003 dated Sep. 9, 1999, performed by NERAC Inc., 23 pages.
Sheets from a report on fingerprint recognition patents No. 00044726.tmp not dated, performed by NERAC Inc., 2 pages.
Sheets from a report on fingerprint recognition patents No. 00026421.tmp not dated, performed by NERAC Inc., 6 pages. Sep. 09, 1999.
Sheets entitled Citations from Predicasts—New Product Announcements: NPA ISS 99-43, 3 sheets. Sep. 09, 1999.
Print-out from "abio.com/products" website, 4 pages, dated Oct. 25, 1999.
Print-out from "digitech-products" website, 2 pages, dated Oct. 25, 1999.
Print-out from "dermalog.de" website, 1 page, dated Oct. 25, 1999.
Print-out from "keywareusa.com" website, 3 pages, dated Oct. 25, 1999.
Print-out from "zdnet.com" website, entitled "American Biometric BioMouse Plus", 2 pages, dated Oct. 25, 1999.
Print-out from "z.dnet.com" website, entitled Compaq Fingerprint Identification Technology, 2 pages, dated Oct. 25, 1999.
Print-out from "zdnet.com" website, entitled Digital Persona U.are.U Deluxe, 2 pages, dated Oct. 25, 1999.
Print-out from "zdnet.com" website, entitled "Indicator BioLogon", 2 pages, dated Oct. 25, 1999.
Print-out from "zdnet.com" website, entitled "Identix TouchSafe Personal", 2 pages, dated Oct. 25, 1999.
Print-out from "zdnet.com" website, entitled "Saflink SAF/NT 2.0", 2 pages, dated Oct. 25, 1999.
Print-out from "zdnet.com" website, entitled "Sony Fingerprint Identification Unit", 2 pages, dated Oct. 25, 1999.
Print-out from "dss.state.ct.us" entitled "Human Services User Group", vol. 3, Issue 2, dated Mar. 1999, 26 pages.
USPTO Search for a "spec/fingerprint and spec/garage" in 1976-1999, USPTO Database, 1 page. Oct. 26, 1999.
USPTO Search for a "fingerprint and access" in all years, USPTO Database, 2 pages. Oct. 25, 1999.
USPTO Search for a "fingerprint and transmission" in all years, USPTO Database, 2 pages. Oct. 25, 1999.
USPTO Search for a "fingerprint and transmitter" in all years, USPTO Database, 1 page. Oct. 25, 1999.
USPTO Search for a "fingerprint and infrared" in all years, USPTO Database, 1 page. Oct. 25, 1999.
USPTO Search for a "fingerprint and motor" in all years, USPTO Database, 1 page. Oct. 25, 1999.
Print-out from "abio.com" website, 4 pages, dated Jan. 25, 2000.
Search Report entitled "Biological Pattern Recognition Tech Track", search performed by NERAC Inc., dated Oct. 27, 1999, 3 pages.
Search Report performed by NERAC Inc., entitled "Biological Pattern Recognition Tech Track", dated Oct. 31, 1999, 21 pages.
Search Report from "esp@cenet" website regarding "thumbprint", dated Jan. 17, 1999, 1 page.

* cited by examiner

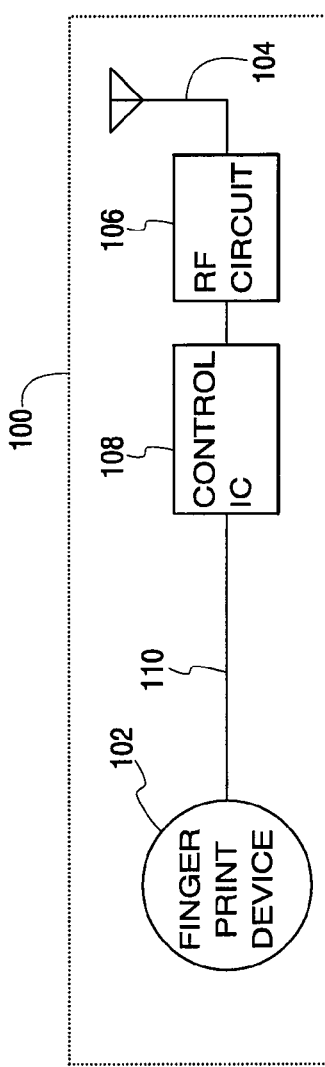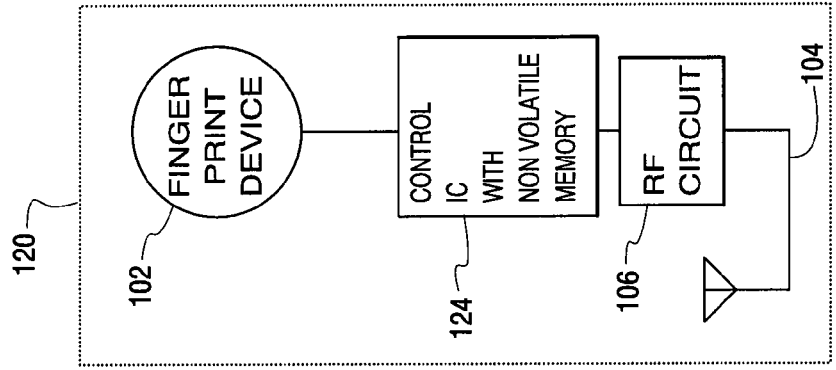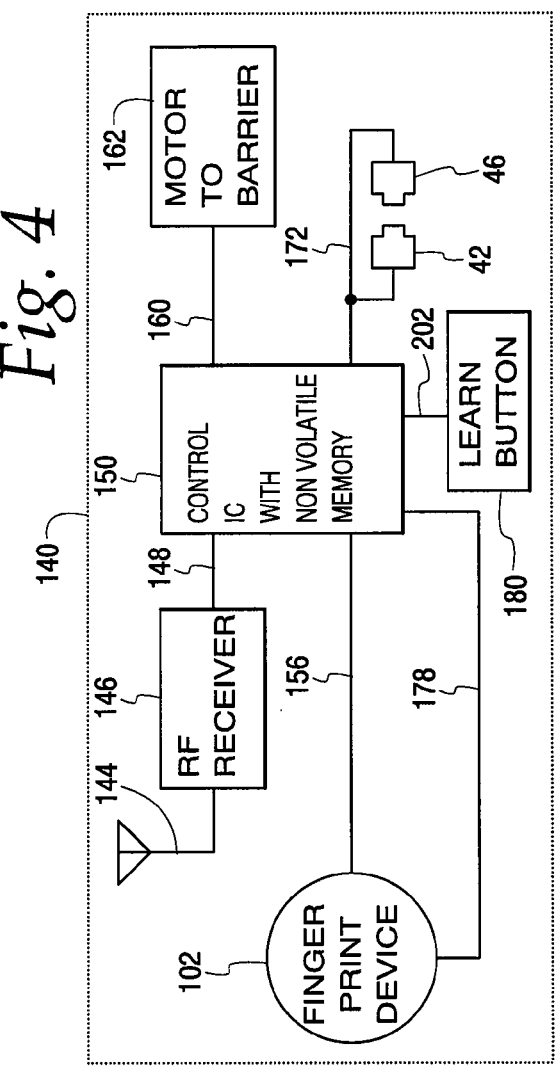

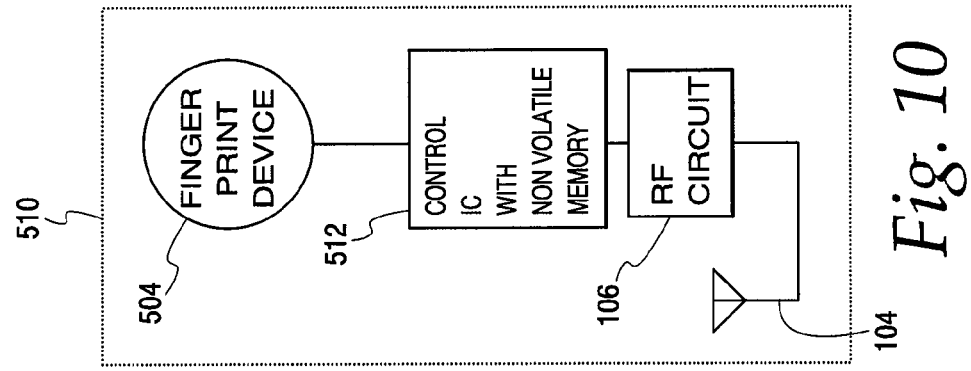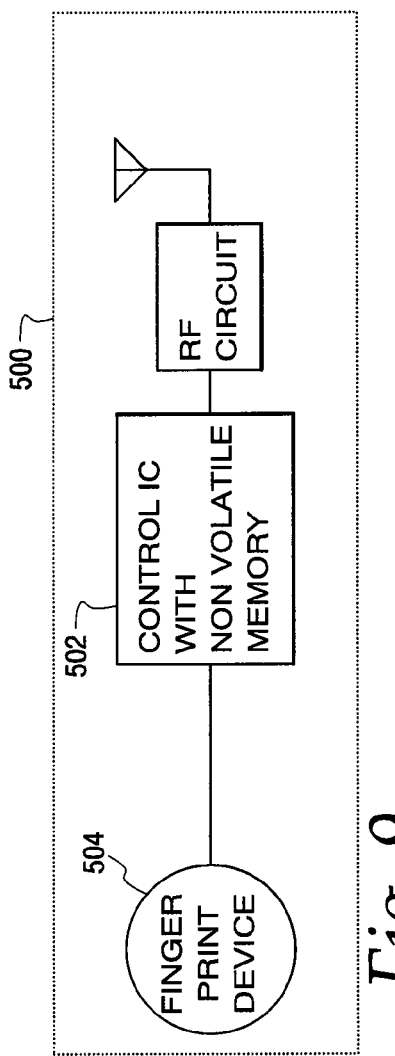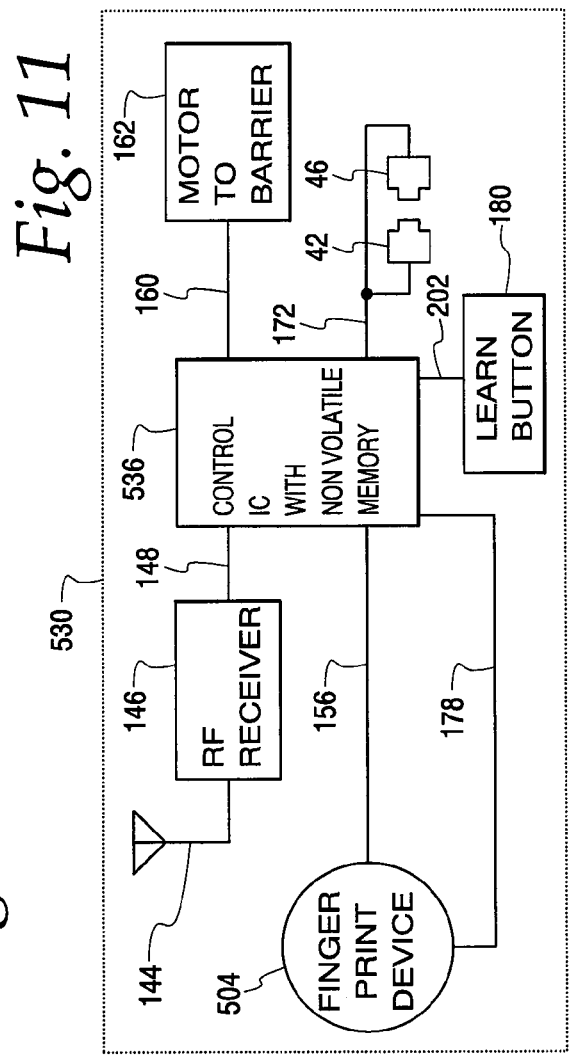

GARAGE DOOR OPERATOR HAVING THUMBPRINT IDENTIFICATION SYSTEM

This application claims the benefit of U.S. Provisional Application No. 60/172,677, filed Dec. 20, 1999.

BACKGROUND OF THE INVENTION

1. Field of the Invention

The invention relates, in general, to movable barrier operators and, in particular, to garage door operators having systems for receiving data transmissions that are encoded or encrypted to identify one or more authorized users, optionally without regard to the particular transmitter employed.

2. Description of the Related Art

The garage door of many homes is controlled by a garage door opening system which protects against unwanted uses by means of electronically transmitted and received access codes. The access code systems now available provide a sufficient level of security so that for many homeowners the garage door is one of the primary means of entering and exiting the house. Home convenience and protection equipment such as garage door operators, lighting systems and security systems are coming to be viewed as necessities and not merely luxuries. These systems are often controlled by transmitters providing a radio frequency signal carrying coded information. For security, the coded information must be kept secret and can, for example, be taken from a large number of possible codes. For convenience, the transmitters and receivers they control should be simple to program.

Various controller systems have been proposed and/or manufactured using digital radio control and digital system processing, and allowing codes to be established by the user or randomly generated. In one system, a unique code is established at the transmitter using a number of two-position switches. The remote receiver also has a like number of switches to set the established code. For further information on the structure and operation of such a system, reference may be made to U.S. Pat. No. 29,525 to Willmott. In U.S. Pat. No. 4,178,549 to Ledenbach et al., the receiver recognizes a received signal from a particular transmitter by measuring and comparing relative durations of the pulse and non-pulse time intervals. Other systems have been proposed which do not require the user to set the code by operating switches on the transmitter and receiver. In one system, a random code generator at the receiver establishes the code. The new code is placed in the memory of a transmitter by holding the transmitter in proximity to the receiver which flashes the established code by means of a light emitting diode to a phototransistor in the transmitter. In another system, each transmitter has its own unique code. The receiver can store up to five unique codes. Should a transmitter be lost or stolen, the code for that transmitter can easily be removed from the memory of the receiver. For further information concerning the structure and operation of such systems, reference may be made to U.S. Pat. No. 4,529,980 to Liotine et al., and U.S. Pat. No. 4,750,118 to Heitschel et al., respectively.

Garage door operators have become more sophisticated over the years, providing users with increased convenience and security. However, further improvements are sought, such as ease of establishing the identity to the user and be granted access by either the receiver or transmitter component of a garage door operating system. Improvements for increasing the ease with which a user can generate data needed to set up a transmitter or receiver are continuously being sought. Further advantages have been sought in improving the ease with which a user can generate data identifying the user as one authorized to operate a transmitter, a receiver, or other components of a garage door operator control system. Further, it is desirable that the data developed by the user be suitable for encoding in a practical manner.

SUMMARY OF THE INVENTION

The invention relates in general to garage door operator systems for controlling an actuator in response to receiving an authorized and especially a coded authorized transmission. The apparatus includes a fingerprint device which identifies an individual as being authorized to transmit a coded signal which, when detected by a receiver within radio frequency range, will decode the transmitter signal, recognizing the code and energizing the receiver so as to actuate a garage door operator.

A need exists for a door operator system with enhanced security features which automatically limits access to authorized users, thereby providing protection to the homeowner if the garage door transmitter should become lost or stolen. In order to be commercially successful, such systems must not have their convenience or usefulness degraded as by requiring the homeowner to perform lengthy and difficult setup procedures.

This need is met and an advance in the art is achieved with the present invention, in which a garage door transmitter/actuating receiver system stores both transmitter-specific and thumbprint or other fingerprint identification data for use by the garage door actuator and its related control system.

In one embodiment, the transmitter responds to received thumbprint data and activates its transmission output stage only when a received thumbprint data set matches a stored thumbprint data set. Thus, the transmitter is able to provide a high level of security and automatic protection while requiring a user to merely perform a single "keypress" motion with the thumb. Accordingly, should the transmitter become lost or stolen, any attempt to operate the transmitter by unauthorized individual will automatically be ignored with a high degree of security.

With a simple thumbpress, an authorized user causes the control system associated with the garage door actuator to receive authorized security codes, which may be made specific to a particular user. The actuator control system responds to received access codes and activates the door only when a received code matches a stored valid code.

In one embodiment, a transmitter permits activation of a garage door control system by transmitting data containing a rolling portion and a fixed code portion. The data includes an indication of which authorized user initiated transmission, and it is possible to take action uniquely reserved for that particular individual. For example, in a two car family having a multiple car garage, the correct garage door will "automatically" respond to the individual operating the transmitter. In addition, only certain members of the household can, via their thumbprint, be granted access to learning or programming features of a garage door control system.

BRIEF DESCRIPTION OF THE DRAWINGS

FIG. 2 is a schematic diagram of a hand-held transmitter operating system of the garage door operator and system shown in FIG. 1;

FIG. 3 is a schematic diagram of a wall-mounted transmitter operating system of the garage door operator and system shown in FIG. 1;

FIG. 4 is a schematic diagram of a barrier operator system according to principles of the present invention;

FIG. 9 is a schematic diagram of another transmitter device according to principles of the present invention;

FIG. 10 is a schematic diagram of another wall mounted transmitter device according to principles of the present invention;

FIG. 11 is a schematic diagram of another barrier operator device according to principles of the present invention;

DETAILED DESCRIPTION OF THE PREFERRED EMBODIMENTS

Figure 1:
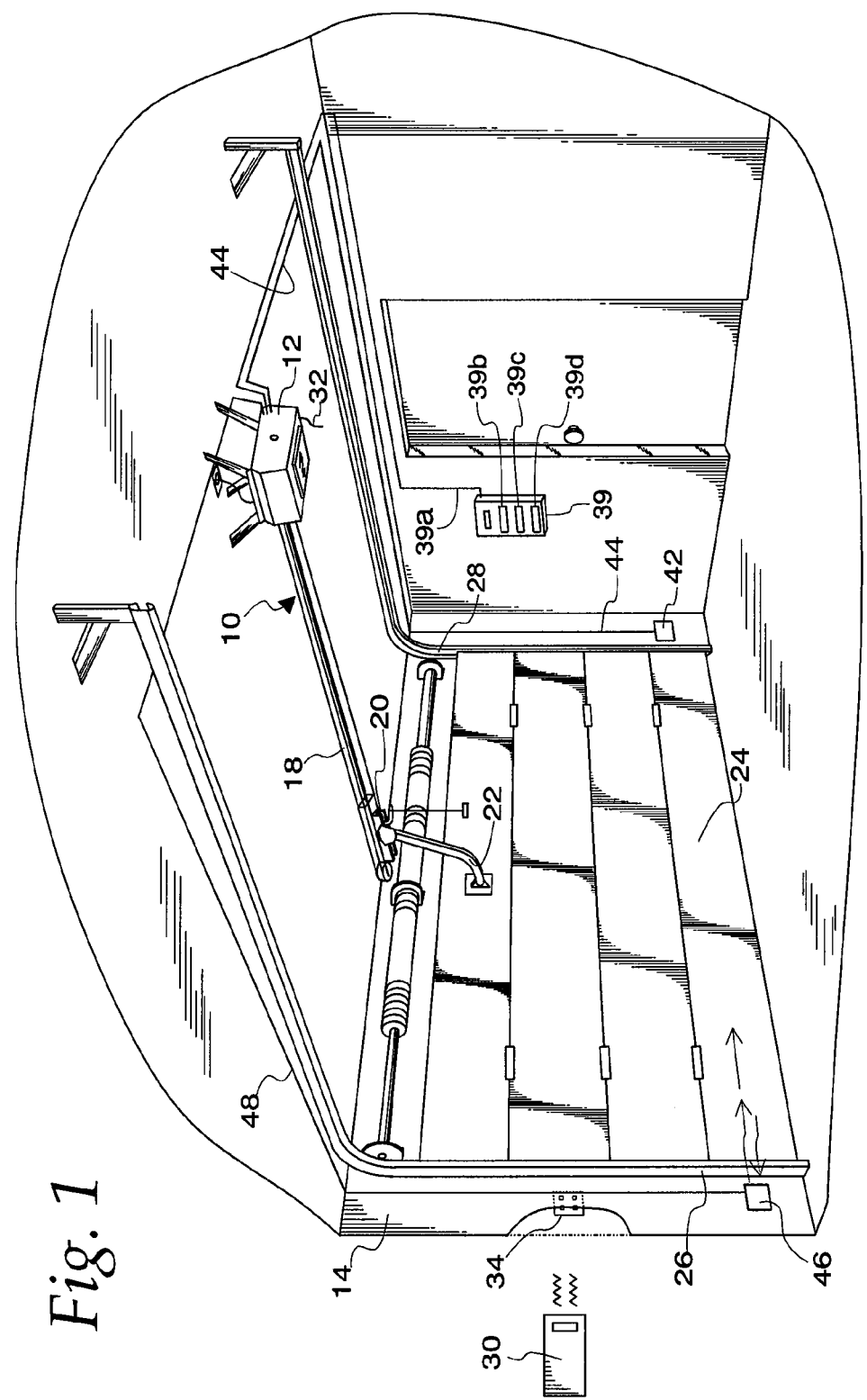
FIG. 1 shows a garage door and operator system embodying the present invention.

Referring now to the drawings and especially to FIG. 1, a garage door operator system embodying the present invention is generally indicated at 10, and includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver incorporated in the head unit 12. An external control pad 34 is positioned on the outside of the garage having one or more buttons, windows or the like devices thereon and communicates via radio frequency transmission with antenna 32 located at the head unit 12. A control module 39 is mounted on a wall of the garage. The control module 39 may be connected to the head unit by a pair of wires, but is preferably radio-linked via an antenna 39a. The control module 39 includes a light switch 39b, a lock switch 39c and a command or LEARN switch 39d. A protective system is employed with an optical emitter 42 connected via a power and signal line 44 to the head unit. An optical detector 46 is connected via a wire 48 to the head unit 12.

Two embodiments of systems for garage door operator control will be discussed. These systems include provision for establishing highly reliable user identity codes with a minimum of effort by the user. A first system is shown in FIGS. 1-8, with FIGS. 2, 3 and 4 showing transmitter and receiver modules employed in the system.

FIG. 2 shows a schematic diagram of a module (i.e., car or hand-held) transmitter 100 of the type generally identified in FIG. 1 by reference numeral 30. Transmitter 100 has an input in the form of a conventional fingerprint device 102 and an output in the form of an antenna 104 radiating radio frequency information. Preferably, the data outputted from transmitter 100 is in the form of a sequence of trinary code digits, including both trinary rolling code digits and trinary fixed code digits described in commonly assigned U.S. Pat. No. 5,949, 349, the disclosure of which is herein incorporated by reference. The present invention can also be employed with less rigorous security systems employing, for example, only fixed code data formats.

Data information from the fingerprint device 102 is sent to the control circuit 108 which is preferably, but not necessarily, embodied as a special purpose integrated circuit. The control circuit 108 outputs data to the radio frequency circuit 106.

The fingerprint device 102 preferably includes a window against which a user's thumb is pressed. The thumbprint is used to provide biometric identification data unique to the user's anatomy. Although fingerprint data can be taken from any digit of the user's hand, it is generally preferred that the biometric identification information employed in the present invention be taken from one of the user's thumbs, as this simplifies the image processing to be performed.

Preferably, the fingerprint device contains a window of conductive rubber and especially rubber impregnated with graphite. The window is coated with an electroluminescent material which illuminates to emphasize the ridges on the surface of a user's thumb. The illuminated ridge pattern is scanned by an inexpensive CCD camera. A mapping of the thumbprint ridges is stored in temporary memory. The thumbprint image data is then digitized according to a predetermined pattern, and a thumbprint data set comprising a predetermined number of data points, is extracted. Preferably, the fingerprint device employed is offered for sale by Who? Vision Systems, Inc., a unit of XL Vision, Inc. of Sebastian, Fla. under the designation TACTILESENSE Fingerprint module.

The data points of the sensed thumbprint image are compared against stored sets of thumbprint data resident in a non-volatile memory either in the fingerprint device, the transmitter or the received barrier operator. In the first embodiment, thumbprint data set matching is carried out in a receiver/barrier operator system 140 to be described below in FIG. 4. This results in a substantially reduced cost for the fingerprint device in that non-volatile memory and circuitry to perform comparison is not required.

The fingerprint device 102 outputs the digitized thumbprint data points to the control circuit 108 on the line 110. Preferably, the control circuit 108 performs only simple line level and pulse squaring functions on the incoming data from the fingerprint device 102 but does not perform interpretation functions thereon. The output of the control circuit 108 is in digital pulse form and is fed to the RF circuit 106. In the preferred embodiment, the information passed through the RF circuit 106 and radiated by the antenna 104 is preferably of the trinary rolling code data type having both rolling code and fixed code digits. The information digits in both rolling code and fixed code format are generated in the control circuit 18 in the manner described in commonly assigned U.S. Pat. No. 5,949,349, the disclosure of which is herein incorporated by reference. It is generally preferred that the control circuit 108 combine the aforementioned data with a code indicating the type of transmitter (i.e., mobile transmitter) radiating the data to a receiver system. If desired, the device code information can also include unique identifiers, similar to the information afforded by a serial number system.

FIG. 3 shows a wall mounted transmitter system 120. As can be seen by comparison with FIG. 2, the wall mounted transmitter system 120 has the same schematic form as the hand-held transmitter system 100, but preferably includes a device code different from that of other types of hand-held and other transmitter devices. Wall mounted transmitter 120 corresponds to the control device 39, shown in FIG. 1.

Although not described in detail herein, it should be understood that the wall-mounted transmitter system 120 can also be employed as a keyless entry system, corresponding to the control pad 34 in FIG. 1, mounted outside of the garage structure. Previously, control devices of this type were provided with a number of key switches such as a numeric keypad which a user would manipulate according to a memorized key code sequence. With the present invention, a user's thumbprint is all that is required in a single "key press" type of manipulation.

Referring again to FIG. 3, the antenna 104 and the RF circuit 106 are the same as employed in FIG. 2. The control circuit 124 of the system 120 may of two types, one similar to the control circuit 108 described above and the other containing the addition of an optional non-volatile memory containing additional information to be transmitted through the RF circuit 106 and radiated from the antenna 104. Preferably, as with the hand-held transmitter system 100, the wall-mounted transmitter 120 sends device identification codes through the RF circuit and transmitter, identifying the sending unit as a wall-mounted transmitter component. If multiple wall-mounted transmitters are operated in the same vicinity, additional identification codes can be provided to identify the particular wall-mounted transmitter being activated by a user's thumbprint.

Referring now to FIG. 4, a receiver/barrier operator system, generally indicated at 140, includes control capability to energize a motor in the head unit 12 so as to impart an opening or closing movement to the movable barrier such as a gate or the garage door 24. The logical functions preformable by the barrier operator 140 are invoked, using a number of different transmitter or hard-wired sending devices. A receiving antenna 144 directs radiated radio frequency information to radio frequency receiver 146 which preferably performs simple pulse forming or other "data cleaning" operations on the received information, sending the "raw" data on the line 148 to the control circuit 150. If desired, the radio frequency receiver 146 can provide a simple "pass-through" of the data directly to the control circuit 150. In the preferred embodiment, hard-wired sending devices are employed in the LEARN mode of operation.

As mentioned, in the preferred embodiment, the information transmitted and received is in the form of both rolling code and fixed code. The control circuit 150 performs the necessary interrogation of the data and confirms if the signal received is authorized with respect to the rolling code, according to commonly assigned U.S. Pat. No. 5,949,349. If the received data were in a more simple form, for example, solely in a fixed code form, the control circuit 150 would perform the necessary data interrogation to determine if the coded information corresponds to that of a valid transmitter.

In a second aspect, the control circuit of the barrier processes fingerprint data arranged in the form of a structured thumbprint data set. As indicated in FIG. 4, control circuit 150 includes non-volatile memory, which is provided for storing previously acquired thumbprint data sets corresponding to different authorized users. The control circuit 150 performs a match-seeking comparison between the incoming thumbprint data set and previously stored or LEARNED thumbprint data sets. If a match is found, and optionally if rolling code authentication is proven, then a user's request is translated into appropriate control signals sent on a line 160 to a motor 162 which in turn imparts an opening or closing motion to the garage door as required. A photo beam system with an emitter 42 and a detector 46 send appropriate permissive or blocking signals on input line 172 to the control module 150. Other types of interactive accessories can also be employed with the control system, if desired.

In a further mode of operation, barrier operator system 140 is employed to LEARN (i.e., save a user's thumbprint. In its simplest form, an appropriate LEARN command signal is communicated to control circuit 150 instructing the control circuit to receive fingerprint identification data on the line 178 and to store the data in non-volatile memory within the control circuit. If desired, thumbprint data integrity checks can also be performed by the control circuit 150 before storing the received thumbprint data set. As will be seen in the second embodiment, the LEARN command can also be sent by the remote RF-linked transmitters. Preferably, for security purposes, the command to LEARN, i.e., identify and store in non-volatile memory a thumbprint data set, is communicated by a hard-wired LEARN button 180 which preferably is in the form of a dedicated key switch. In order to store a thumbprint data set for later recognition in the barrier operator 140, a user would issue a thumbpress to the fingerprint device 102 while simultaneously pressing the LEARN button 180. In this manner, incoming fingerprint data is routed on the line 178 to the LEARN port of the control circuit 150, rather than the fingerprint data input port connected to the line 156. As will be seen herein, the LEARN mode is also employed to store both fingerprint and rolling code data as transmitted via RF data signals into the non-volatile memory of the control circuit.

Before proceeding to a detailed explanation of various operating modes of the garage door operating system, it should be mentioned that the barrier operator system 140 shown in FIG. 4 can be located in the head unit 12 of FIG. 1, if desired. This may be preferred in certain instances because of manufacturing and cost control advantages, especially since designs have already been developed providing radio receiving functions in the head unit, as shown above with reference to FIG. 1. However, with the user authentication provisions associated with the present invention, and in particular the LEARN mode requiring use of a fingerprint device dedicated to the barrier operator, it may be convenient to provide an additional wall-mounted unit. At a minimum, it is anticipated that the fingerprint device 102 and the LEARN button 180 be conveniently located in this wall-mounted position, with the remainder of the barrier operator 140 located in the head unit 12 shown in FIG. 1. It is contemplated, in this regard, that the fingerprint data lines 156, 178 and the line connecting LEARN button 180 to the control circuit 150 be hard wired, or optionally radio-linked, to the head unit.

Figure 5:
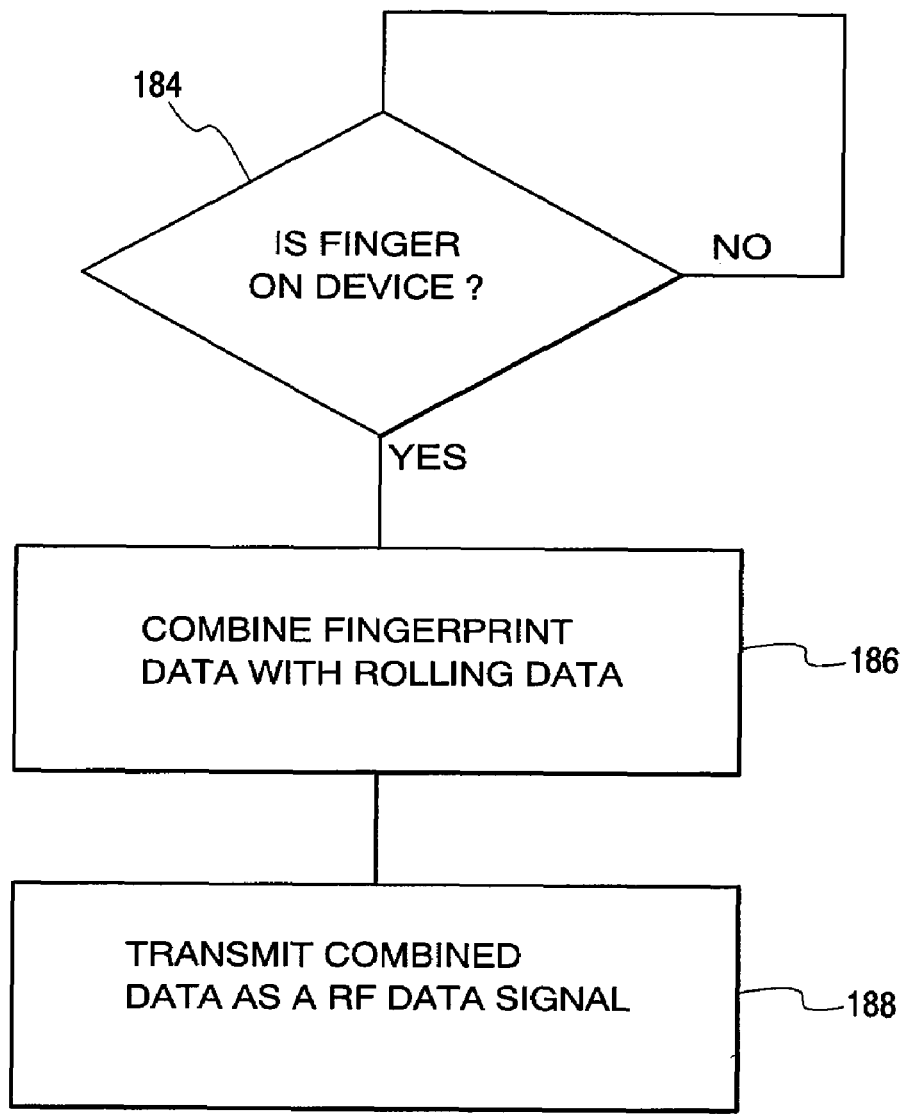
FIG. 5 is a schematic diagram of a transmitter according to principles of the present invention.

Referring now to FIG. 5, operation of either transmitter 100 or 120 is shown in greater detail. While the respective transmitter is energized, the fingerprint window is continuously scanned to detect if the user's thumb is pressed against the device, as indicated in step 184. Once a finger press is detected, control is transferred to step 186 in which the fingerprint data received from fingerprint device 102 is combined with the rolling code data in control circuit 108 of FIG. 2 or control circuit 124 of FIG. 3. The combined data is then transmitted in step 188 as a radio frequency signal, preferably one having a sequence of multiply formatted digits. Any conversion of data to the radio frequency regime is carried out in either the control circuit or the radio frequency circuit of the transmitter.

Figure 6:
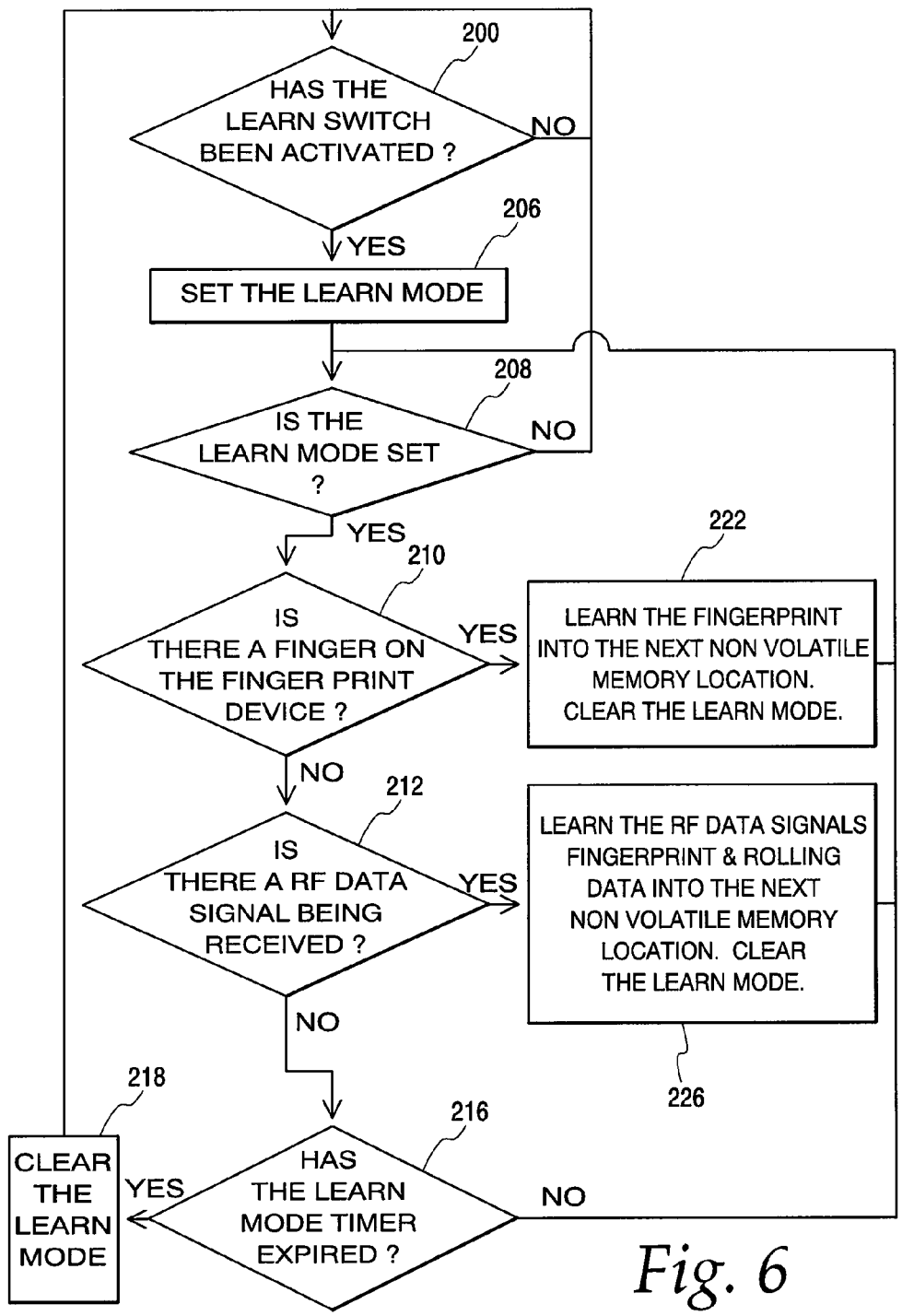
FIG. 6 is a schematic diagram of a LEARN system for the barrier operator of FIG. 4.

Referring now to FIG. 6, the LEARN procedure for the barrier operator of FIG. 4 will now be described. Beginning with a step 200, the control circuit 150 polls an input line 202 to determine if the LEARN switch 180 is depressed. Upon detection of a key press at the LEARN switch 180, the LEARN mode is set within control circuit 150 as indicated by step 206 and is confirmed in step 208. As indicated above, the present invention provides heretofore unattainable convenience by requiring a user to only execute a simple thumbpress to provide the necessary individual data input to the barrier operator system. In the LEARN mode, the system expects a thumbpress at fingerprint device 102 of FIG. 4 (causing a data transmission therefrom) concurrent with actuation with LEARN switch 180. Accordingly, program control is transferred to a step 210 to confirm that thumbpress information has been processed by the fingerprint device 102 and the output data is being communicated on the line 178 to an appropriate input port of the control circuit 150 (see FIG. 4). As mentioned above, the present invention also contemplates that fingerprint data may be transmitted via a radio frequency communications link and, in the absence of thumbpress data from the fingerprint device 102 in FIG. 4, control is transferred to a step 212 to determine if RF data is being received by the antenna 144 and the RF receiver 146.

In order to carry out step 212, it is preferred that the control device 150 poll the input line 148 during the LEARN operation. If radio frequency data and thumbpress data are not detected by the control circuit 150, control is transferred to a step 216 to determine if a "LEARN mode timer" located within the control circuit 150 has expired. If so, control is transferred to a step 218 to clear the LEARN mode flag previously set. Control is then transferred to the step 200, thus requiring the user to release and re-actuate the LEARN switch 180 to initiate further processing of the LEARN mode.

If the control circuit 150 detects fingerprint data on the line 178 in the step 210, control is transferred to the step 222 which directs the incoming fingerprint data on the line 178 to be stored into the next non-volatile memory location internal to the control circuit 150. A step 222 contains routines to verify that the thumbprint data on the line 178 is properly formatted and within a predetermined range of values. As an added feature, in the step 222, previously stored fingerprint data can be compared to determine if there is a match with the newly acquired fingerprint data. Action can then be taken to alert the user as to duplication of data, if desired.

Assuming a thumbpress is not detected in the fingerprint device 102 of the barrier operator system shown in FIG. 4, control is transferred to the step 212, as indicated above. Assuming valid radio frequency data is being received on the line 148, control is transferred to the step 226.

As indicated in FIG. 4, it is generally preferred that the two input lines, 156, 178, be provided between the fingerprint device 102 of FIG. 4 and control circuit 150. Although operation of the LEARN procedure shown in FIG. 6 can be accomplished with a single input line 156, it is generally preferred for system security purposes, that a separate dedicated line 178 be provided for LEARN mode operation.

In a step 226, the incoming RF data signals are interrogated for valid format, it being generally preferred that the incoming coded information be provided in multiple portions (e.g., a rolling code portion and a fixed code portion) according to commonly assigned U.S. Pat. No. 5,949,349 which, as mentioned, is incorporated as if fully set forth herein.

As previously indicated, in the step 186 (see FIG. 5) the fingerprint data, i.e., the thumbpress data set, is combined with rolling code data, either the rolling code portion thereof or the fixed code portion thereof. In the step 222 the incoming radio frequency data is disassembled and after various formatting tests and other verification procedures, the thumbprint data set information is identified and stored in the next open volatile memory location internal to the control circuit 150. The remaining rolling code data is also stored in non-volatile memory within control circuit 150, either with the disassembled thumbpress data set, or in a separate memory location.

The LEARN mode is then cleared and program control is transferred to the step 208 for confirmation. In normal operation, control is then transferred to the polling step 200.

Figure 7:
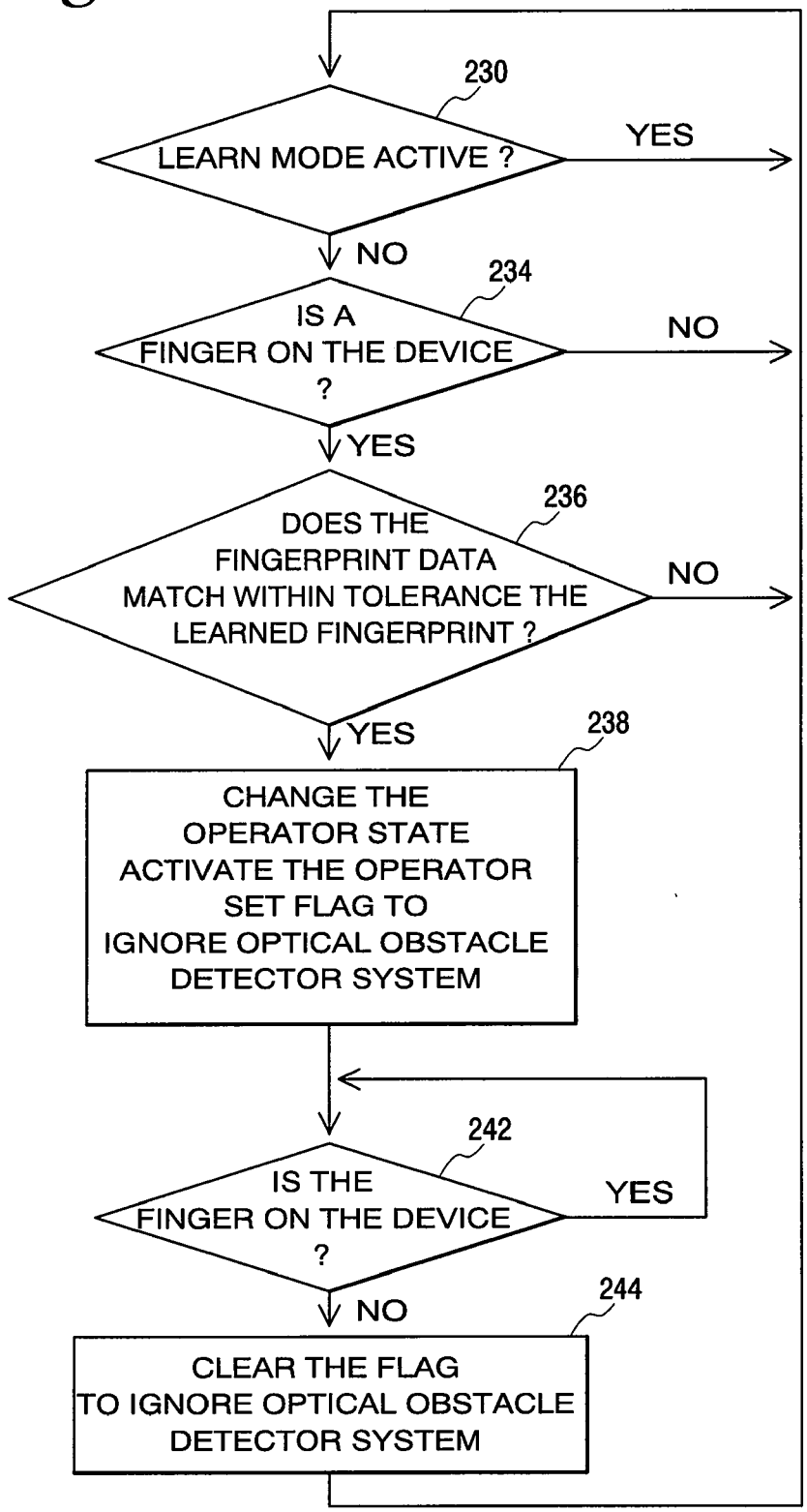
FIG. 7 shows the fingerprint device of FIG. 4 in greater detail.

Turning now to FIG. 7, NORMAL (i.e., non-LEARN) operation of the barrier operator system 140 of FIG. 4 will now be described. It should be understood that the NORMAL operation indicated in FIG. 7 is concurrently active with the LEARN procedure shown in FIG. 6. Accordingly, in a step 230 the determination is made if the LEARN mode has been "set", i.e., made active. A flag within control circuit 150 is employed for this purpose. A "true" response in the step 230 indicates that the LEARN switch 180 has been depressed as indicated in the step 200 (see FIG. 6) and the LEARN mode flag has accordingly been set in the step 206 (also shown in FIG. 6). If the LEARN mode has been determined to have been set in the step 230, the LEARN mode flag internal to the control circuit is continuously polled until it is determined that the LEARN mode is no longer active.

Control is then transferred to the step 234 to determine if a user is carrying out a thumbpress operation. In the step 234 the thumbpress being detected can come from a variety of sources, including the fingerprint device in the barrier operator system 140 shown in FIG. 4, the mobile transmitter 100 (either installed in a vehicle or hand held) or the wall mounted transmitter 120 shown in FIG. 3. If the thumbpress is being carried out by an RF transmitter, RF data verification and identification according to step 226 (see FIG. 6) is carried out within the step 234.

A thumbpress detected in the step 234 indicates that a thumbpress data set is being sent to the barrier operator system 140. In the step 236 determination is made as to whether the received fingerprint data matches, within tolerance limits, one of the LEARNED fingerprint data sets stored in nonvolatile memory in control circuit 150. A match in step 236 indicates that the identity of an authorized user has been confirmed with a high level of confidence according to biometric identification principles. The user's control request is then transferred to a step 238 to perform an appropriate change in operator state internal to the control circuit 150. This in turn triggers internal routines to send an appropriate control signal on the line 160 to the motor 162 to physically carry out the user's request with respect to movement of the garage door. In addition, in a step 238 it is preferred that a flag be set within the control circuit 150 to ignore the photobeam systems 42, 46, an optional feature which allows a user to "override" damaged photo beam systems. If desired, a step 238 could be modified so as to allow the photo beam protectors 42, 46 to continue to operate autonomously to provide either a permissive signal, an absence of a blocking signal, or a blocking signal on line 172 to control circuit 150.

Control is then transferred to a step 242 to wait until the thumbpress is released from the fingerprint device. According to the preferred mode of a step 242, a user's command, is carried out when thumb pressure is relieved from the fingerprint device being actuated. If desired, radio frequency transmitted requests can be made redundant, i.e., set at the transmitter to repeat a limited predetermined number of times proven sufficient to ensure that a properly operating transmitter/receiver set are able to complete the necessary radio frequency communications. Alternatively, data can be continuously transmitted from the radio frequency transmitter which is remote from the barrier operator system. Control is then transferred to a step 244 which clears the ignore obstacle detection flag and control is thereafter passed to the polling step 230.

Figure 8:
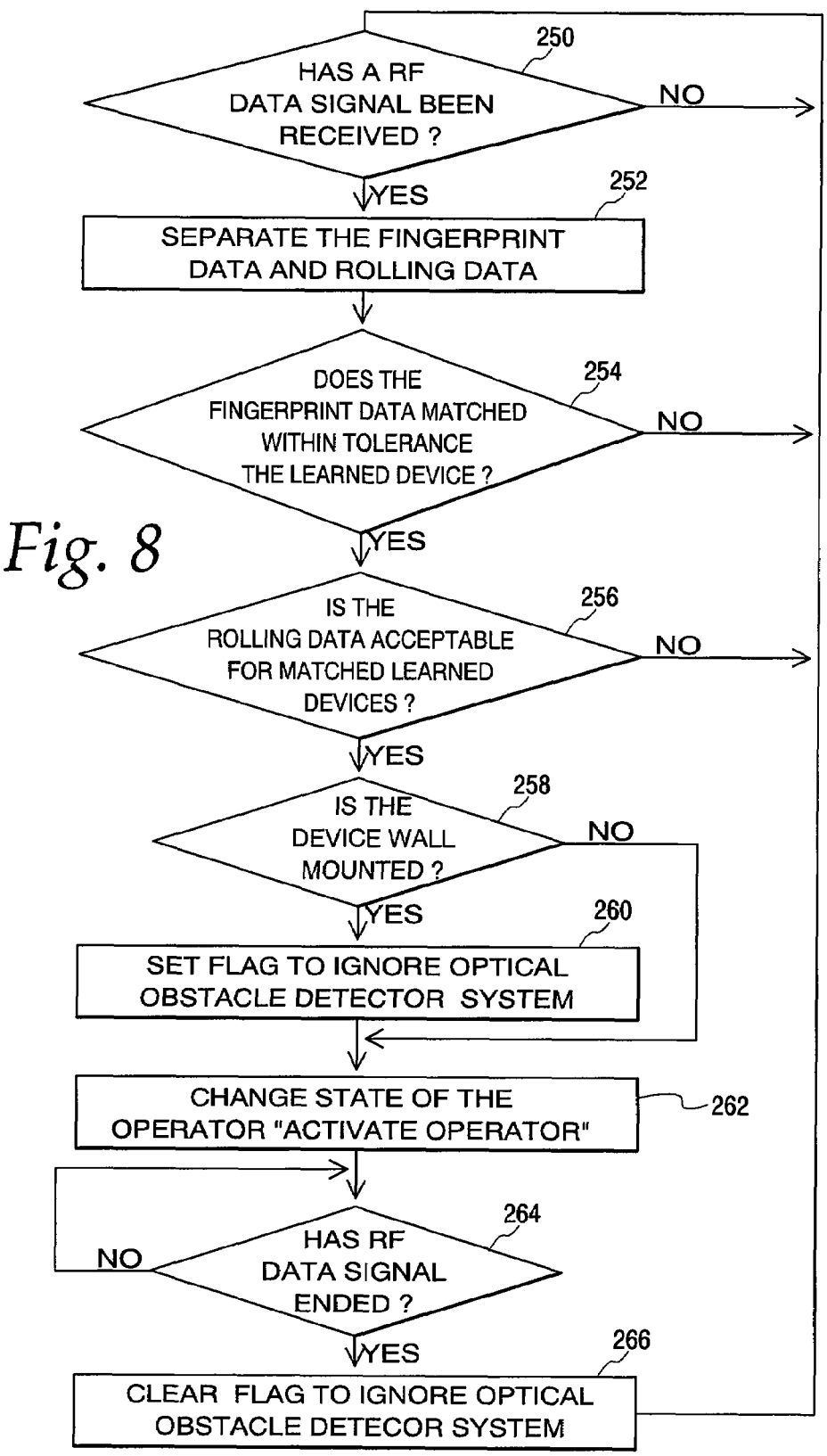
FIG. 8 is a schematic diagram showing the receiver of FIG. 4 in greater detail.

As mentioned above, it is contemplated that NORMAL operation of the barrier operator system can also be carried out at points spaced from the transmitter, via remotely transmitted signals. With reference to FIG. 1 the signals can come from a mobile transmitter, either resident within a vehicle or hand held, a communication panel located on the outside of the garage structure or a wall mounted communication panel located within the garage or house to which the garage is associated. With reference to FIG. 8, operation of the barrier operator/receiver system 140 of FIG. 4 will now be described.

In a step 250, the incoming line 148 in FIG. 4 is continuously polled to determine if an RF data signal is being received at the control circuit 150. Upon detection that RF data is present on the line 148 and received in the control circuit 150, control is transferred to the step 252 to separate the combined fingerprint data and remainder of the rolling data. In a step 252 the fingerprint data portion is analyzed to determine if it matches previous thumbprint data sets stored in non-volatile memory in circuit 150. It is contemplated that, in a step 254 the criteria for a match between data sets does not require complete identity of data but rather contemplates that there is some tolerance, i.e., some degree of non-identity between the newly detected thumbpress data set and the previously stored thumbpress data set(s). If a match is not detected in the step 254, control is transferred to the polling step 250.

Upon indicating that a satisfactory fingerprint match has been detected in the step 254, control is transferred to the step 256 where analysis of the incoming data is performed to determine if a satisfactory device match has been detected. As mentioned above, it is preferred that the transmitting devices either hard wired or coupled through radio frequency communication links include device identification data to indicate at a minimum the type of sending device employed. For example, it may be desirable to carry out different operations when a user is located within a garage structure rather than a vehicle located on a nearby street or driveway. In particular, there has been found a need to provide emergency "override" features should part of the overall system become damaged.

One area of concern has been raised when photo beam obstacle detectors become damaged in a manner such that further physical operation of the garage door is blocked by the supervising control circuit. It is desirable in such instances to provide the user with an opportunity when located at a wall-mounted transmitter within the garage to invoke commands to the supervising control circuit while neglecting indications of the photo beam protector circuit. An example of this type of operation is provided in a step 260, as will be discussed below. Thus, it is frequently necessary to provide additional analysis of the incoming data, and suitable analyses are therefore indicated as being performed on the remainder of the incoming "rolling data", i.e., the remainder of the rolling code data being transmitted. In a step 256, reference is made to "matched LEARNED devices". The step 256 accordingly contemplates that each device connected to the overall system be initialized or "LEARNED" thereby requiring the supervising control circuit (herein assumed to be located in the operator barrier/receiver system 140 of FIG. 4. Once a device has been interrogated and authenticated by a supervisory control circuit, the required device identification data, or "LEARNED device" data is stored in non-volatile memory for subsequent match-seeking comparisons with incoming data, as may be required. As mentioned above, the device identity data preferably includes at a minimum a pre-arranged code identifying the type of device as defined by the system manufacturer. Alternatively, the device identification data can include a code or other information uniquely identifying the particular device involved, thus providing information similar to that offered by various serial number systems.

In a step 258 the device type data portion of the rolling data is interrogated to determine if the device is wall mounted. An example of a particular wall mounted transmitter device was described above with respect to FIG. 3. It is assumed that any necessary validation of the device type data has been previously carried out in a step 256. If the sending device is determined to be wall mounted, i.e., located internal to the garage structure, the "ignore protector" flag internal to the supervising control circuit is set in a step 260 and control is then passed to a step 262, otherwise control is transferred directly to the step 262. In the step 262 the validity (and optionally level the of authority of the user) is determined with a high degree of confidence and in the step 262 the user's request is converted into an appropriate change of state of the operator as determined by control circuit 150 with the necessary control signals being sent on the line 160 to the motor 162 (see FIG. 4). In a step 264 further operation is halted until the RF data signal has ended. Control is then passed to a step 266 in which the ignore obstacle detector flag is cleared and control is thereafter passed to the polling step 250.

Referring now to FIGS. 9-15, a second embodiment of the present invention will now be described. One feature of the second embodiment is that match-seeking comparison operations are carried out at the transmitter device to determine if incoming fingerprint data is that of a previously authorized user. Thus, if the transmitter should become lost or stolen or otherwise fall into unauthorized hands, transmitter functions can be immediately blocked.

Referring first to FIG. 9, a mobile transmitter, either vehicle mounted or hand held, is indicated at 500. The transmitter 500 is similar to the aforementioned mobile transmitter 100 except that certain features in a control circuit 502 are added to those features described above with respect to the control circuit 108. Previously learned thumbprint data sets that have been stored are used to identify respective individual users.

The transmitter 500, unlike the transmitter 100, has a LEARN mode of operation in which thumbpress data information is analyzed and, if validly determined in a LEARN mode, is stored in non-volatile memory in the fingerprint device 504 of the transmitter. The LEARN mode of operation for the transmitter will be described in detail with reference to FIG. 12. Fingerprint device 504 contains circuitry to perform a match-seeking comparison between incoming thumbpress data information and previously learned or stored thumbpress data information. The output on line 110 going to control circuit 502 has a number of different possible features. For example, the output of fingerprint device 504 can simply indicate that a match has occurred, can additionally add information as to the current user's identity and, if desired, can also transmit the incoming thumbpress data set information to the control circuit. Since non-volatile memory is provided in the fingerprint device 504, as described above, the control circuit 502 need not be provided with non-volatile memory if a simpler, less expensive commercial embodiment is desired. However, at times, additional functionality is required, and accordingly the control circuit of the transmitter in FIG. 9 can be provided with non-volatile memory to perform functions other than biometric or thumbprint data matching. For example, in control circuit 502, non-volatile memory can be provided to store various data received from another control circuit indicating the device type and optionally the particular device of the transmitter involved, and this can be stored with the entire set of fingerprint data transmitted from the active fingerprint device 102.

Referring now to FIG. 10, a wall mounted transmitter is generally indicated at 510 and is similar in certain respects to the transmitter 120 described above. Wall mounted transmitter 510 includes a fingerprint device 504 which includes non-volatile memory for match-seeking comparison purposes. Therefore, control circuit 512 need not have non-volatile memory if a more cost effective commercial embodiment is required. The data output of fingerprint device 504 is transmitted to control circuit 512 and, with the addition of any coded information, is passed to RF circuit 106 for radiated transmission from antenna 104.

As with the transmitter 500, it is preferred that transmitter 510 include an identification code indicating the type of transmitter device (i.e., wall mounted as opposed to mobile) and optionally can also include coded information identifying the unique transmitter device employed (similar to the information provided by a serial number system).

Referring now to FIG. 11, barrier operator system 530 shares similar features with the barrier operator system described above with reference to FIG. 4. For example, radio frequency signals are accepted by antenna 144, operated upon by RF receiver circuit 146 and transmitted to control circuit 536 via input line 148. A fingerprint device 504 is connected to control circuit 536 via two input lines, the first input line 156 being reserved for NORMAL operation and the second input line 178 being reserved for LEARN mode of operation. A LEARN button 180 is connected by line 202 to control circuit 536 and photo beam protectors 42, 46 are connected to control circuit 536 by input line 172. On verification of the user's identify, optional authorization level, on valid formatting of user's instructions, control circuit 536 transmits suitable instructions to motor 162 via line 160.

Figure 12:
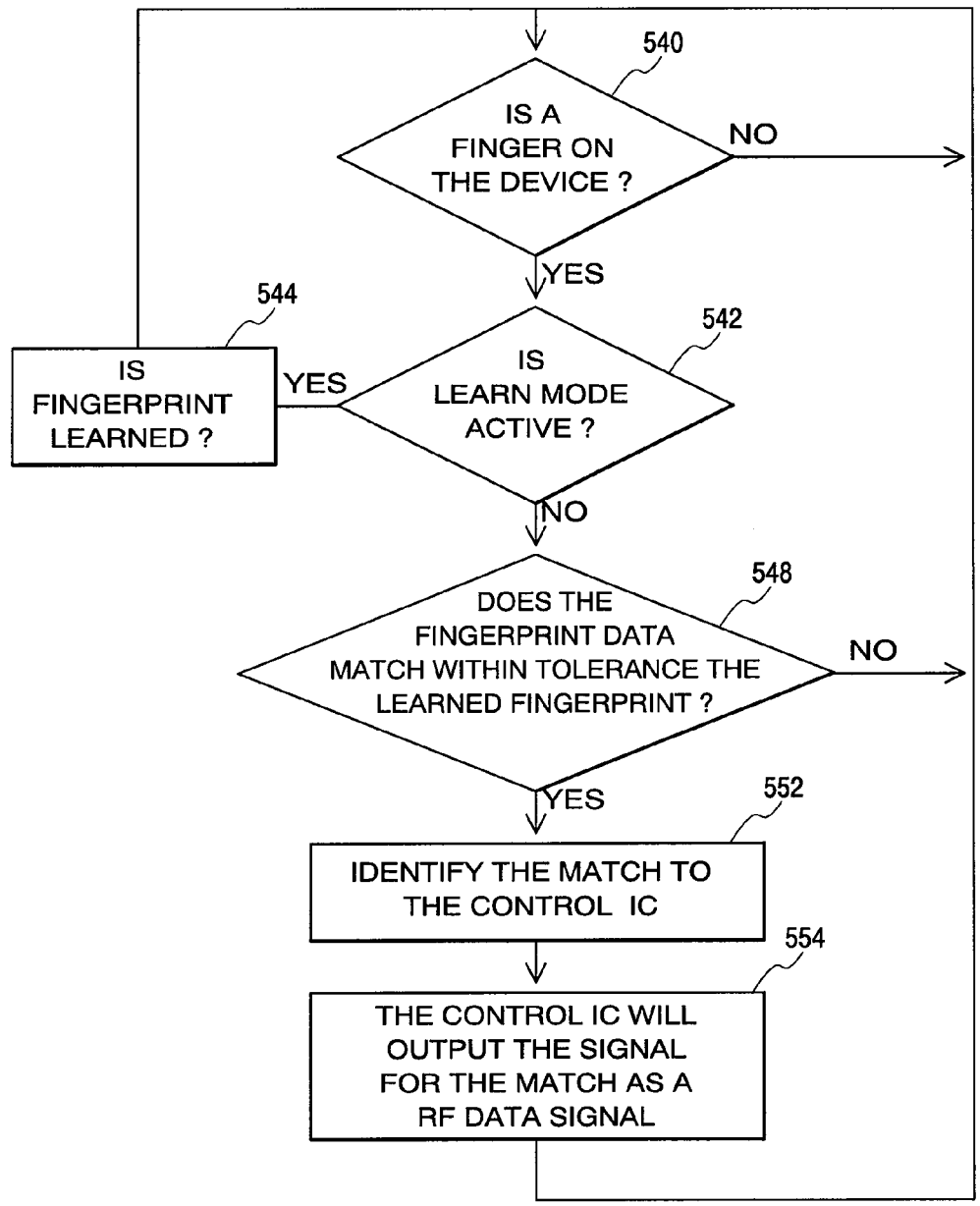
FIG. 12 is a schematic diagram of a transmitter device of FIGS. 9-11.

Referring now to FIG. 12, the preferred LEARN procedure for either transmitter 500 or 510 will be described. In step 540 a fingerprint device 504 is continuously polled for presence of a thumbpress. When a thumbpress is received, control is transferred to step 542 which determines if a LEARN mode of operation has been made active. For example, a dedicated button can be provided with either transmitter 500 or 510 or the fingerprint device 504 can be programmed to recognize two or more short pressure pulses or as unusually long sustained "pulse" applied to the fingerprint device as a pre-arranged method of triggering a LEARN mode signal transmitted to the respective control circuit 502 or 512. In any event, if the LEARN mode is made active, control is transferred to step 544 where the thumbprint is LEARNED, i.e., a digital thumbprint data set representative of the thumbprint image is stored in a next available non-volatile memory location, with control then being passed to polling step 540.

If the LEARN mode is not active as determined by step 542, control is transferred to step 548 where determination is made as to whether the incoming fingerprint data constitutes, within tolerance limits, a "match" with a previously learned thumbprint data set. If a match, within tolerance is not observed, control is transferred to polling step 540.

If the thumbprint data set is matched in step 548 to a previously learned thumbpress data set, then control is transferred to step 552 where the match is identified to sub-portions of the control circuit 502 or 512. Control is then transferred to step 554 in which the control circuit 502 or 512 outputs a radio frequency data signal indicating that a match has occurred. The radio frequency data signal, as mentioned above, can indicate simply that a match has been made, can additionally indicate the previously stored identity for the particular thumbprint data set (e.g., user number 1, user number 2 or user number 3) and, in addition, the thumbprint data set itself can be incorporated in the RF data signal. In step 554, any required properly formatted instruction set is combined with the RF data signal, and such combination is preferably made in rolling code format according to previously assigned U.S. Pat. No. 5,949,349. Control is then transferred to the polling step 540.

Figure 13:
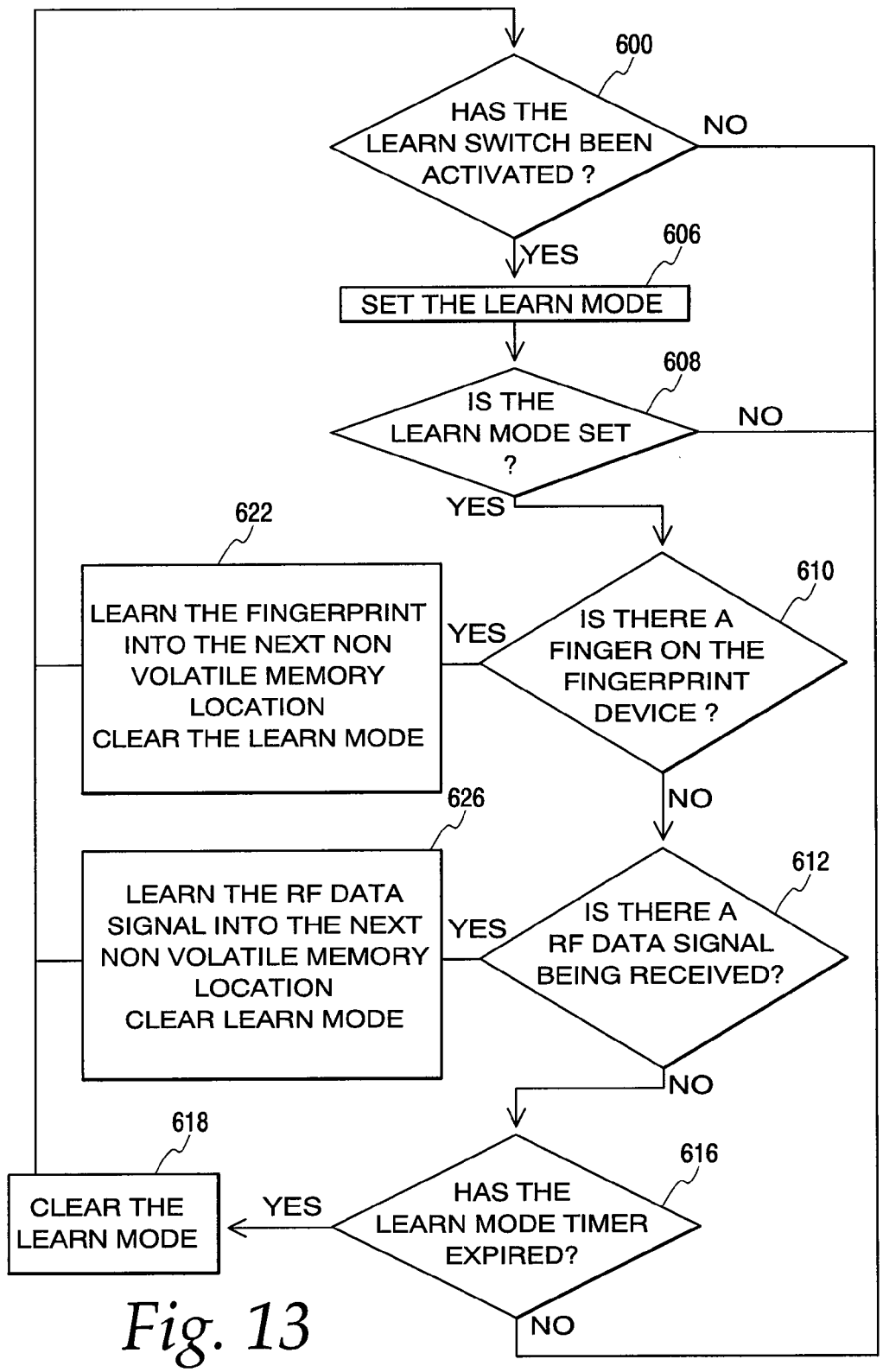
FIG. 13 is a schematic diagram of a LEARN function of the barrier operator of FIG. 11.

Referring now to FIG. 13, the preferred LEARN mode of operation for the barrier operator system of FIG. 11 is described. As indicated in FIG. 13, the first step 600 the control circuit 536 polls input line 202 to determine if the LEARN switch 180 is depressed. Upon detection of a key press at switch 180, the LEARN mode is set within control circuit 536 as indicated by step 606 and is confirmed in step 608. As indicated above, the present invention provides heretofore unattainable convenience by requiring a user to only execute a simple thumbpress to provide the necessary individual data input to the barrier operator system. In the LEARN mode, the system expects a thumbpress at fingerprint device 102 of FIG. 11 (causing a data transmission therefrom) concurrent with actuation with LEARN switch 180. Accordingly, program control is transferred to step 610 to confirm that thumbpress information has been processed by fingerprint device 102 and the output data is being communicated on line 178 to an appropriate input port of control circuit 536 (see FIG. 11). As mentioned above, the present invention also contemplates that fingerprint data may be transmitted via a radio frequency communications link and, in the absence of thumbpress data from the fingerprint device 102 in FIG. 11, control is transferred to step 612 to determine if RF data is being received by antenna 144 and RF receiver 146.

In order to carry out step 612, it is preferred that control device 536 poll the input line 148 during the LEARN operation. If radio frequency data and thumbpress data is not detected by control circuit 536, control is transferred to step 616 to determine if a "LEARN mode timer" internal within control circuit 536 has expired. If so, control is transferred to step 618 to clear the "LEARN mode" previously set. Control is then transferred to step 600, thus requiring the user to release and re-actuate the LEARN switch 180 to initiate further processing of the LEARN mode.

If the control circuit 536 detects fingerprint data on line 178 in step 610, control is transferred to step 622 which directs the incoming fingerprint data on line 178 to be stored into the next non-volatile memory location internal to control circuit 536. Step 622 contains routines to verify that the thumbprint data on line 178 is properly formatted and within a predetermined range of values. As an added feature, in step 622, previously stored fingerprint data can be compared to determine if there is a match with the newly acquired fingerprint data.

Assuming a thumbpress is not detected in fingerprint device 102 of the barrier operator system shown in FIG. 11, control is transferred to step 612, as indicate above. Assuming radio frequency data, proven to be valid, is being received on line 148, control is transferred to step 626.

In step 626, the incoming RF data signals are interrogated for valid format, it being generally preferred that the incoming coded information be provided in multiple portions (e.g., a rolling code portion and a fixed code portion) according to commonly assigned U.S. Pat. No. 5,949,349 which, as mentioned, is incorporated as if fully set forth herein. As previously indicated, in step 186 (see FIG. 5) the fingerprint data, i.e., the thumbpress data set, is combined with rolling code date, either the rolling code portion thereof or the fixed code portion thereof. In step 622 the incoming radio frequency data is disassembled and after various formatting tests and other verification procedures, the thumbprint data set information is identified and stored in the next open volatile memory location internal to control circuit 536. The remaining rolling data is also stored in non-volatile memory within control circuit 536, either with the disassembled thumbpress data set, or in a separate memory location.

The LEARN mode is then cleared and program control is transferred to step 608 for confirmation. In normal operation, control is then transferred to the polling step 600.

Figure 14:
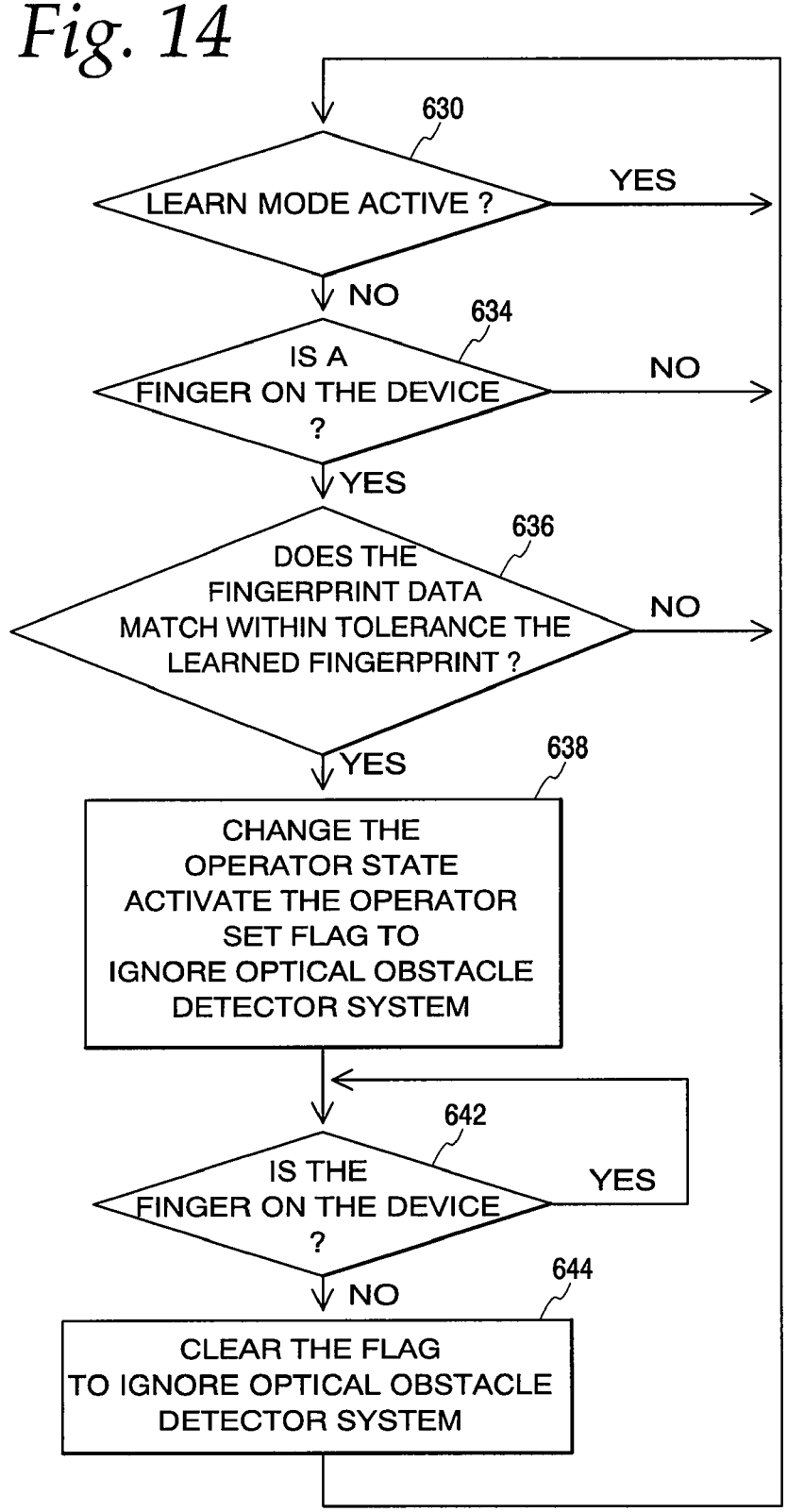
FIG. 14 is a schematic diagram of the fingerprint device of FIG. 11.

Turning now to FIG. 14, NORMAL (i.e., non-LEARN) operation of the barrier operator system 530 of FIG. 11 will now be described. It should be understood that the NORMAL operation indicated in FIG. 14 is concurrently active with the LEARN procedure shown in FIG. 13. Accordingly, in step 630 the determination is appropriately made to determine if the LEARN mode has been "set", i.e., made active. A "true" response in step 630 indicates that the LEARN switch 180 has been depressed as indicated in step 600 (see FIG. 13) and the LEARN mode has accordingly been set in step 606 (also shown in FIG. 13). If the LEARN mode has been determined to have been set in step 630, a LEARN mode flag internal to the control circuit is continuously polled until it is determined that the LEARN mode is no longer active.

Control is then transferred to step 634 to determine if a user is carrying out a thumbpress operation. In step 634 the thumbpress being detected can come from a variety of sources, including the fingerprint device in the barrier operator system 530 shown in FIG. 11, the mobile transmitter 100 (either installed in a vehicle or hand held) or the wall mounted transmitter 120 shown in FIG. 3. If the thumbpress is being carried out by an RF transmitter, RF data verification and identification according to step 626 (see FIG. 13) is carried out within step 634.

A thumbpress detected in step 634 indicates that a thumbpress data set is being sent to barrier operator system 530. In step 636 determination is made as to whether the received fingerprint data, within tolerance limits, matches one of the learned fingerprint data sets stored in non-volatile memory in control circuit 536. A match in step 636 indicates that, according to biometric identification principles, the identity of an authorized has been confirmed with a high level of confidence. The user's control request is then transferred to step 638 to perform am appropriate change in operator state internal to control circuit 536. This in turn triggers internal routines to send an appropriate control signal on line 160 to motor 162. In addition, in step 638 it is preferred that a flag be set within control circuit 536 to ignore the photo beam protectors 42, 46. If desired, step 638 could be modified so as to allow the photo beam protectors 42, 46 to continue to operate autonomously to provide a permissive signal, in absence of a blocking signal, or a blocking signal on line 172 to control circuit 536.

Control is then transferred to step 642 to wait until the thumbpress is released from the fingerprint device. In step 642, a user's command is carried out when thumb pressure is relieved from the fingerprint device being actuated. If desired, radio frequency transmitted requests can be set at the transmitter to repeat a limited predetermined number of times, prove insufficient to ensure that a properly operating transmitter/receiver set are able to carry out the necessary radio frequency communications. Alternatively, data can be continuously transmitted from the radio frequency transmitter remote to the barrier operator system. Control is then transferred to step 644 which clears the "ignore protector" flag and control is thereafter passed to the polling step 630.

As mentioned above, it is contemplated that NORMAL operation of the barrier operator system can also be commended via remotely transmitted signals. As indicated in FIG. 1 the signals can come from a mobile transmitter, either resident within a vehicle or hand held, a communication panel located on the outside of the garage structure or a wall-mounted communication panel located within the garage or house to which the garage is associated.

Figure 15:
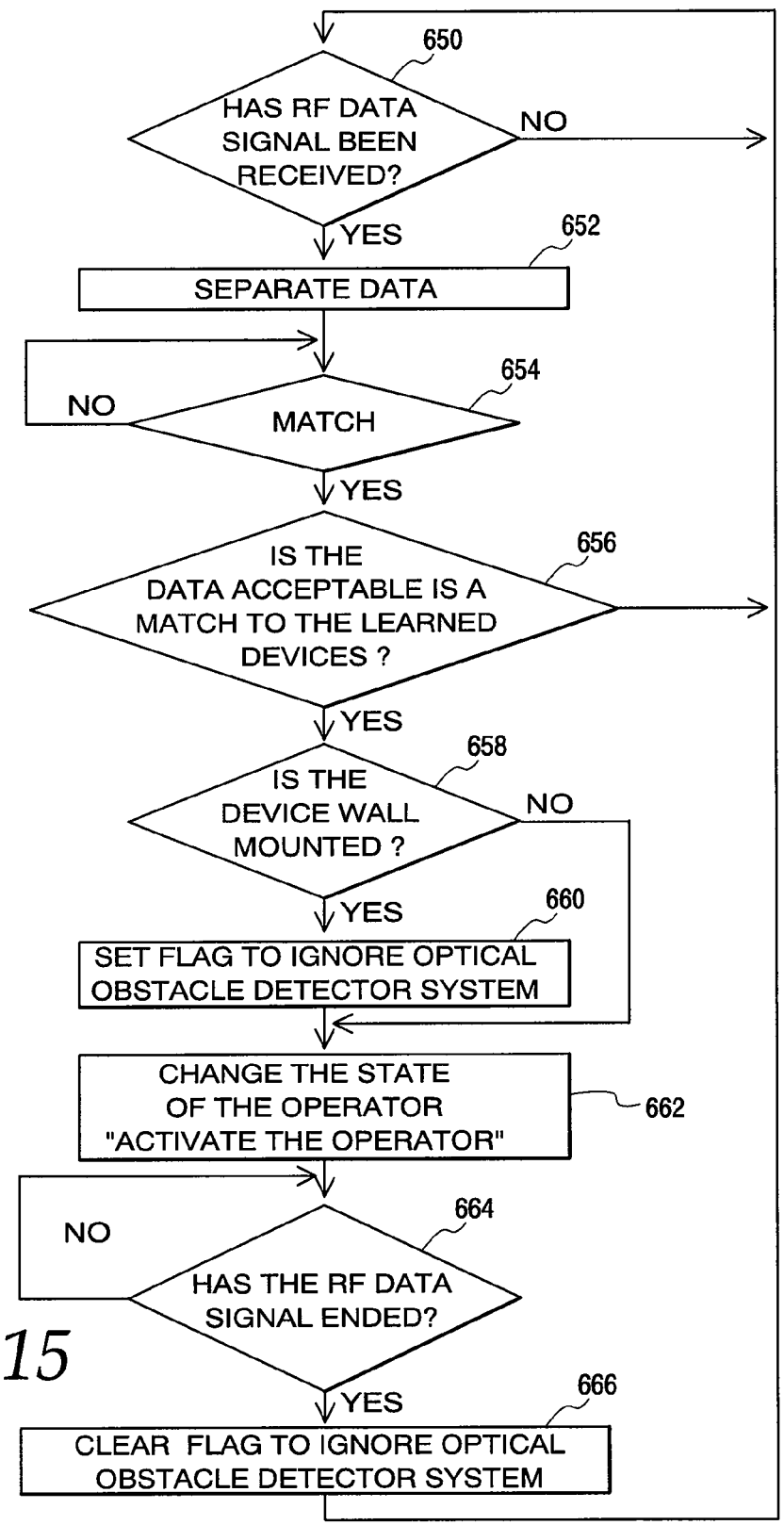
FIG. 15 is a schematic diagram showing the receiver of FIG. 11 in greater detail.

Referring now to FIG. 15, NORMAL operation of the barrier operator receiver of FIG. 11 will now be described. In a first step 650, incoming line 148 in FIG. 11 is continuously polled to determine if an RF data signal is being received at control circuit 536. Upon detecting that RF data is present on the line 148 and received in the control circuit 536, control is transferred to a step 652 to separate the combined fingerprint data and remainder of the rolling data. In a step 654 the fingerprint data portion is analyzed to determine if it matches previous thumbprint data sets stored in non-volatile memory in circuit 536. We have contemplated that, in step 654 the criteria for a match between data sets does not require complete identity of data but rather contemplates that some tolerance, i.e., some degree of non-identity between the newly detected thumbpress data set and the previously stored thumbpress data set(s). If a match is not detected in the step 654, control is transferred to the polling step 650.

Upon indicating that a match has been detected in the step 654, control is transferred to the step 656 where the so-called "rolling data", i.e., the remainder of the rolling code data transmitted, is deemed as acceptable for the data sets previously learned, and stored within the control circuit 536. Preferably, in the step 656 a matching operation is carried out for the rolling data, comparing the incoming rolling data set to previously stored device data sets. As previously mentioned, it is generally preferred that each unit sending instructions to the barrier operator system 530 include or generate a code which identifies the type and optionally also the unique identify of the sending device.

In a step 658 the device type data portion of the rolling data is interrogated to determine if the device is wall-mounted. An example of a wall mounted-device was described above with respect to FIG. 3. It is assumed that any necessary validation of the device type data has been previously carried out in the step 656. If the sending device is determined to be wall mounted, i.e., located internal to the garage structure, the ignore obstacle detector flag is set in a step 660 and control is then passed to a step 662, otherwise control is transferred directly to step 662. In the step 662 the validity and optional level of authority of the user is determined with a high degree of confidence. In the step 662 the user's request is converted into an appropriate change of state of the operator as determined by the control circuit 536 and the necessary control signals are sent on the line 160 to the motor 162 (see FIG. 11). In the step 664 further operation is halted until the RF data signal has ended. Control is then passed to the step 666 in which the ignore obstacle detector flag is cleared and control is thereafter passed to the polling step 650.

As has been noted above, the garage door operator control system according to principles of the present invention includes provisions for learning, i.e., recognizing and saving various types of information, including individual user's identity (via biometric information) and device information, (both by type and by individual device identity). Certain procedures have been described for carrying out the LEARN mode. In addition to these, consideration has been given to the following methods of learning critical information, according to principles of the present invention.

As a first method, enablement of the LEARN mode is automatically established upon initial contact with the wall control unit or other previously designated device. Alternatively, the LEARN mode can be enabled upon the first contact with a recognized serial port device.

As a second general method for initiating LEARN mode, the first person accessing the transmitter with a thumbpress is designated as the key user who identifies other people to be LEARNED by the system, by pressing a dedicated button and placing their finger onto the fingerprint device.

As a third learning method, the LEARN mode can be set upon initial bidirectional communication with the supervisory control circuit via a radio frequency link. The LEARN mode can be initiated from the remote transmitter device by sending an initial LEARN code to the supervisory control circuit in the receiver unit.

As a fourth learning mode, a special learning session is instituted upon entering a special dealer code into the supervisory control circuit. In this learning method, the control circuit is programmed to await the next user to access the system, automatically entering the user identification data in the aforedescribed LEARN modes of operation.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A rolling code responsive movable barrier operator system for controlling access to a secure area comprising:
   a fingerprint communicating unit disposed outside the secure area and remote from a barrier movement operator inside the secure area, the fingerprint communicating unit comprising:
   a fingerprint sensor disposed outside the secure area which generates finger print code representative of a finger print and a signal representative of the fingerprint;
   a transmitter controller which combines the finger print code representing the fingerprint with a separate rolling access code to provide a changing combined authorization code and a changing combined authorization code signal representative of the changing combined authorization code, which separate rolling access code is configured to effect access to the secured area by active communication with a rolling code acceptance apparatus and, which separate rolling access code changes as a result of each combined signal transmission in accordance with a predetermined algorithm to produce the changing combined authorization code and changing combined authorization code signal which is representative of the separate rolling access code and the finger print code;
   a transmitter which emits, prior to verification that a sensed finger print is from an authorized user, the changing combined authorization code signal representative of a sensed fingerprint from the fingerprint sensor and the separate rolling access code; and
   the barrier movement operator comprising:
   a receiver inside the secure area which receives the changing combined authorization code signal representative of the separate rolling access code and the sensed fingerprint, the receiver having a learning mode in which a portion of the combined authorization code signal which is representative of the sensed fingerprint emitted by the transmitter is received by the barrier movement operator and stored in a memory thereof;
   a fingerprint circuit disposed inside the secure area and responsive to the received changing combined authorization code signal, the fingerprint circuit for decoding the portion of the changing combined authorization code signal to identify the portion of the changing combined code signal representing the sensed fingerprint and for determining whether the portion of the signal representing the sensed fingerprint is representative of an authorized user, the finger print circuit effective for receiving the changing combined authorization code signal, separating the portion of the received changing combined authorization code signal representative of the sensed fingerprint from the separate rolling access code, and reading the stored signal representative of the sensed finger print to verify authorized users without transmitting a signal to the transmitter;
   the rolling code acceptance apparatus configured to determine whether the separate rolling access code is acceptable after the fingerprint circuit verifies the authorized user; and
   a barrier operator circuit which commands a barrier to assume a particular position when the sensed fingerprint is determined to be from an authorized user and the separate rolling access code is determined to be acceptable.

2. A movable barrier operator system according to claim 1 wherein the fingerprint sensor comprises an optical fingerprint sensor.

3. A movable barrier operator system according to claim 2 wherein the optical fingerprint sensor is an electroluminescent fingerprint sensor.

4. A movable barrier operator system according to claim 2 wherein the fingerprint sensor comprises a charged coupled device for generating a signal from which the signal representative of the sensed fingerprint is produced.

5. A movable barrier operator system according to claim 1 wherein the transmitter comprises a radio frequency transmitter and the signal representative of the sensed fingerprint is a radio frequency signal.

6. A movable barrier operator system according to claim 1 wherein the transmitter comprises a wall control.

7. A movable barrier operator system according to claim 1 further comprising a memory associated with the fingerprint sensor and the transmitter for storing information indicative of the fingerprint.

8. A movable barrier operator system according to claim 1 wherein the fingerprint circuit compares a coded identification transmission for operation of the barrier operator circuit.

9. A rolling code responsive movable barrier operator system for controlling access to a secure area comprising:
   a fingerprint sensor disposed outside the secure area which generates finger print code representative of a finger print and a signal representative of a fingerprint;
   a transmitter controller outside the secured area which combines the finger print code representing the fingerprint with a separate rolling access code to provide a changing combined authorization code and changing combined authorization code signal, which separate rolling access code is configured to effect access to the secured area by active communication with a rolling code acceptance apparatus and which separate rolling access code changes in accordance with a predetermined algorithm to produce the changing combined authorization code and changing combined authorization code signal as a result of each combined signal transmission;

a transmitter outside the secured area which emits the changing combined authorization code signal prior to verification that a sensed finger print is from an authorized user and which changing combined authorization code signal includes a signal representative of the sensed fingerprint from the fingerprint sensor and the separate rolling access code;

a receiver inside the secure area which receives the changing combined authorization code signal representative of the sensed fingerprint and the separate rolling access code, the receiver having a learning mode in which a portion of the changing combined authorization code signal representing a fingerprint emitted by the transmitter is received by the receiver and stored in a memory;

a fingerprint circuit disposed inside the secure area and responsive to the received changing combined authorization code signal which decodes the portion of the changing combined authorization code signal to identify the signal representing the sensed fingerprint and which determines whether the signal representing the sensed fingerprint is representative of an authorized user, the finger print circuit effective for receiving the changing combined authorization code signal, separating the received combined signal representative of the sensed fingerprint from the separate rolling access code, and reading the stored signal representative of a finger print to verify authorized users without transmitting a signal to the transmitter;

the rolling code acceptance apparatus inside the secured area which determines whether the separate rolling access code is acceptable after the fingerprint circuit verifies the authorized user; and a barrier operator circuit inside the secured area which commands a barrier to assume a particular position when the fingerprint is determined to be from an authorized user and the separate rolling access code is determined to be acceptable.

10. A method for controlling a moveable barrier operator, the method comprising:

generating a signal and code representative of a sensed fingerprint from a fingerprint sensor disposed outside the secure area;

with a transmitter controller outside the secured area, combining the code representing the sensed fingerprint with a separate rolling access code to provide a changing combined authorization code and changing combined authorization code signal which includes the signal representative of the sensed finger print and the separate rolling access code, which separate rolling access code is configured to effect access to the secured area by active communication with a rolling code acceptance apparatus and which separate rolling access code changes in accordance with a predetermined algorithm to produce the changing combined authorization code signal which changes with each encoded signal transmission and which separate rolling access code changes as a result of each combined signal transmission in accordance with a predetermined algorithm to produce the changing combined authorization code signal;

emitting with a transmitter outside the secured area, prior to verification that a sensed finger print is from an authorized user, the changing combined authorization code signal representative of the sensed fingerprint from the fingerprint sensor and the separate rolling access code;

receiving the changing combined authorization code signal representative of the sensed fingerprint and separate rolling access code with a receiver inside the secured area, the receiver having a learning mode in which the signal representing a fingerprint emitted by the transmitter is received by the barrier movement operator and stored in a memory;

determining whether a portion of the changing combined authorization code signal representing the sensed fingerprint is representative of an authorized user with a fingerprint circuit disposed inside the secure area, the finger print circuit responsive to the received changing combined authorization code signal for decoding the changing combined authorization code signal to identify the signal representing the sensed fingerprint, the finger print circuit effective for receiving a finger print identifying signal representative of the sensed finger print, separating the received combined signal representative of the sensed fingerprint from the separate rolling access code, and reading the stored signal representative of a finger print to verify authorized users without transmitting a signal to the transmitter;

determining whether the separate rolling access code is acceptable after the fingerprint circuit verifies the authorized user to effect access to the secured area with the rolling code acceptance apparatus inside the secured area; and commanding a barrier operator to assume a particular position with a barrier operator circuit when the sensed fingerprint is determined to be from an authorized user and the separate rolling access code is determined to be acceptable.

11. A method according to claim 10 wherein the fingerprint sensor comprises an optical fingerprint sensor.

12. A method according to claim 11 wherein the optical fingerprint sensor is an electroluminescent fingerprint sensor.

13. A method according to claim 10 wherein the fingerprint sensor comprises a charged coupled device for generating a signal from which the signal representative of the sensed fingerprint is produced.

14. A method according to claim 10 wherein the transmitter comprises a radio frequency transmitter and the signal representative of the sensed fingerprint is a radio frequency signal.

* * * * *

UNITED STATES PATENT AND TRADEMARK OFFICE
CERTIFICATE OF CORRECTION

| | | |
|---|---|---|
| PATENT NO. | : 7,642,895 B2 | Page 1 of 1 |
| APPLICATION NO. | : 09/735141 | |
| DATED | : January 5, 2010 | |
| INVENTOR(S) | : Fitzgibbon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Sixteenth Day of November, 2010

David J. Kappos
*Director of the United States Patent and Trademark Office*